Jan. 12, 1965   V. H. ASKE   3,164,997
ACCELEROMETER

Filed Aug. 22, 1960   2 Sheets-Sheet 1

*INVENTOR.*
VERNON H. ASKE

BY Roger W. Jensen
ATTORNEY

Jan. 12, 1965  V. H. ASKE  3,164,997
ACCELEROMETER
Filed Aug. 22, 1960  2 Sheets-Sheet 2

*INVENTOR.*
VERNON H. ASKE
BY Roger W. Jensen
ATTORNEY

3,164,997
ACCELEROMETER
Vernon H. Aske, Hopkins, Minn., assignor to Honeywell Inc., a corporation of Delaware
Filed Aug. 22, 1960, Ser. No. 50,954
19 Claims. (Cl. 73—503)

This invention pertains to motion sensing apparatus and more particularly to accelerometers.

There has long been a definite need in the aeronautical industry for a minature, low cost, and reliable accelerometer and/or integrating accelerometer. This need has become particularly acute in most recent years with the rapid technological developments in the aeronautical and related industries. Up to the present time, this longstanding need for a miniature, low cost, and reliable accelerometer has not been fulfilled. The present invention fulfills this need by utilizing a globule of conductive liquid as a seismic mass element and rebalancing the displacement of this seismic mass by the interaction of a current conducted through this seismic mass at right angles to the direction of the magnetic flux field in which the mass is located.

The present invention is capable of taking different forms and providing several different functions. In one embodiment the invention may be used to produce an output signal which varies in sense and magnitude as a function of the sense and magnitude of the applied accelerational disturbance. In another embodiment of the invention the seismic mass element is permitted to move in response to an applied accelerational disturbance, the motion is damped and the seismic mass element performs a controlling function, such as completing an electrical circuit after it has moved a predetermined distance. This effectively results in the controlling function occurring after a certain time integral of acceleration or in other words after a predetermined velocity has been reached. In connection with this embodiment, a unique arrangement for disabling or caging the accelerometer is provided until such time as it is desired to have the device operate. The output signal from the basic acceleration sensing means as indicated may take an analog form. In a further embodiment of the invention, a digital output signal is provided and suitable electronic means associated therewith will respond to the digital output to give a final output signal which is in the nature of the time integral of the acceleration or in other words a velocity output signal.

It is a general object of this invention to provide an improved control apparatus.

It is another object of this invention to provide a miniature, low cost, and reliable accelerometer.

A further object of the invention is to provide an accelerometer utilizing a globule of conductive liquid as a seismic mass and developing a rebalance force on the mass by conducting a current through the mass at right angles to the magnetic flux field in which it is located.

These and other objects of the invention will become apparent from a study of the accompanying specification and claims in conjunction with the accompanying drawings in which:

Figure 1:
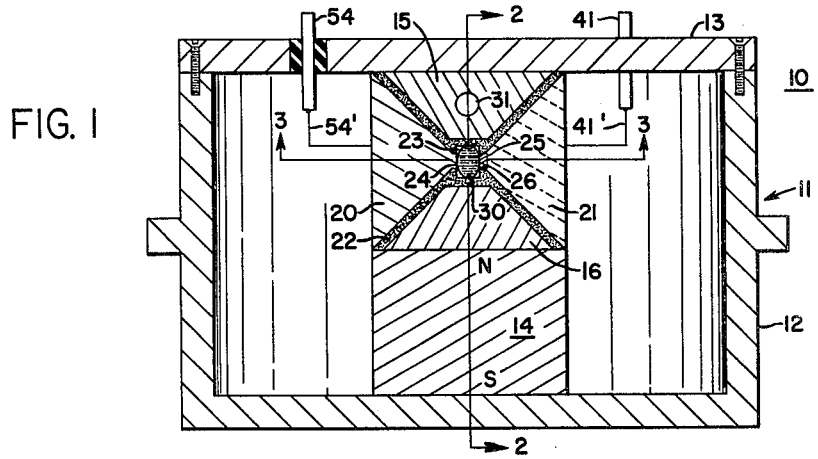
FIGURE 1 is a cross-section of the accelerometer means as viewed along section lines 1—1 of FIGURE 2.
Figure 2:
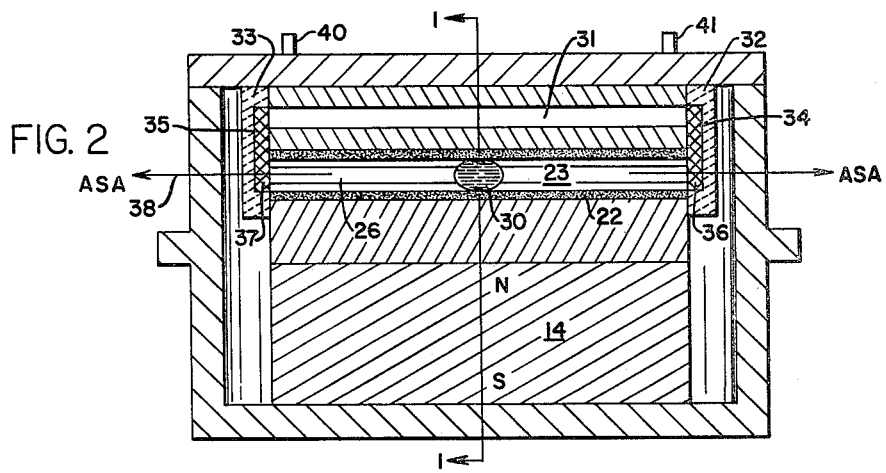
FIGURE 2 is a cross-section of the accelerometer of FIGURE 1 as viewed along section lines 2—2.

Referring to FIGURE 1 the reference numeral 10 generally depicts an accelerometer comprising in part a housing, container, or support means 11. More specifically as shown in the drawing the housing 11 takes the form of a hollow, cylindrically shaped container having a cuplike portion 12 and a cover plate element 13. In this configuration the housing 11 would be made out of a suitable permeable material such as soft iron so as to have good magnetic flux carrying abilities. A suitable magnetic flux producing means is associated with the housing 11. In the specific embodiment shown the magnetic flux producing means takes the form of a permanent magnet 14 positioned within the housing 11. The magnet 14 has a general bar-shaped configuration as shown with the bar generally mounted on the bottom of the cup portion 12 of the housing 13. The magnet 14 is polarized so that the portion of the magnet adjacent to the bottom of the cuplike portion 12 is of one polarity while the other portion as shown in FIGURES 1 and 2 has the opposite polarity. For example, the top portion could have a North polarity as shown in FIGURE 1 and the portion adjacent the bottom of the cup member 12 could have a South polarity. A pair of pole piece members or pole faces 15 and 16 are provided. The pole pieces 15 and 16 are elongated having the same general length as permanent magnet 14. Pole piece 16 is attached to the permanent magnet 14 so as to form a pole face of the North pole thereof. Pole piece member 15 is attached or connected to the cover member 13 in general register with pole piece 16. Generally the pole pieces 15 and 16 project toward one another and define a gap therebetween. The pole pieces 15 and 16 are tapered inwardly so as to concentrate the magnetic flux field which is established across the gap. The complete magnetic circuit includes the housing 11, permanent magnet 14, pole pieces 15 and 16 and the gap. Pole pieces 15 and 16 are made out of a suitable permeable material such as soft iron which, as is well understood, will result in a uniform fluz distribution thus assuring a uniform magnetic flux field in the gap.

A conductor element or contact means 20 and an insulator element 21 are abutted against the pole pieces 15 and 16 on opposite sides of the gap. The elements 20 and 21 are preferably bonded to the pole pieces 15 and 16 by use of a suitable insulative adhesive, such as "Solder Glass." The insulative cement is generally identified in FIGURES 1 and 2 by the reference numeral 22. As will become apparent later it is important for the conductor element or contact means 20 to be electrically insulated from the pole pieces 15 and 16.

Pole pieces 15 and 16, conductor 20, and insulator 21 collectively define a passage 23, it being understood that passage 23 is the aforesaid gap defined by the faces of the pole pieces 15 and 16 as further bounded by the inwardly extending faces of members 20 and 21. The inner face 24 of the conductor member 20 is free of any insulative coating so that it may conduct current for purposes which will be described later. The inner face 25 of the insulator element 21 has attached thereto or mounted thereon a suitable resistance or contact means 26. The combination of insulator element 21 and resistance means 26 attached thereto will be referred to as a resistance element. Resistance or contact means 26 may take different forms such as a separately fabricated resistance element bonded by suitable means to the insulator 21 or such as a resistance film deposited by electrochemical techniques on the inner face 25 of insulator 21. As will be noted in FIGURES 2 and 3 the resistance means 26 extends generally along the extent of the entire passage 23.

A conductive seismic mass means 30 is positioned in the passage 23. In the specific embodiment shown the conductive seismic mass means takes the form of a liquid metal globule. Various substances may be used for the seismic mass such as, for example, a globule of Sodium Potassium (NaK). A sufficient quantity of conductive liquid is provided so that the globule 30 is in engagement with the inner face 24 of the conductor 20 and the resistance element 26. As will be noted in FIGURES 1 and 2 the globule of conductive liquid 30 is also in engagement with the insulative coating 22 on the pole faces of the pole pieces 15 and 16. In some embodiments of the invention the globule 30 may well fill the entire cross-sectional area of the passage 23 while in other embodiments it may not entirely fill up the cross-sectional area of the passage 23.

A longitudinally extending gas return port 31 having a suitable size is provided in pole piece 15. Generally, port 31 extends parallel to the passage 23. A pair of cap members 32 and 33 made out of a suitable insulative material, such as ceramic, are abutted against the ends of the pole pieces 15 and 16, the elements 20 and 21, and are suitably internally recessed as at 34 and 35 respectively. The cap members 32 and 33 provide the function of connecting the passage 23 with the port 31 so as to permit a generally unrestricted flow of gas therebetween. If desired, suitable means may be provided to prevent the globule of conductive liquid 30 from leaving passage 23. In the specific embodiment shown this means takes the form of a pair of filter elements 36 and 37 which fit into the recesses 34 and 35 respectively. Filter elements 36 and 37, as indicated, provide the function of restricting the globule of conductive liquid to the passage 23 and yet permitting the general unrestricted flow of gas between the passage 23 and port 31. A sponge of suitable material such as metal or ceramic would be suitable for this purpose.

The structure described thus far, as indicated defines an elongated passage 23. The passage may be considered in turn to define an acceleration sensitive axis (ASA) 38. It will be understood that there will be relative movement occurring between the seismic mass 30 and the structure forming or defining the passage 23. More specifically, acceleration along the ASA 38 causes relative movement to occur between the seismic mass 30 and the resistance means 26 and conductor element 20. For purposes of discussion it may be assumed that there is substantially no resistance in the conductor element 20.

Figure 4:
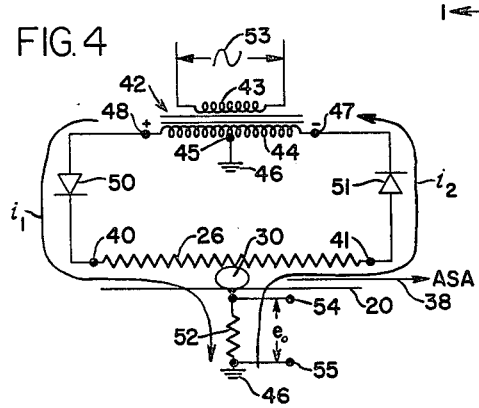
FIGURE 4 is a schematic diagram of the electrical connections of the accelerometer of FIGURES 1, 2 and 3.
Figure 3:
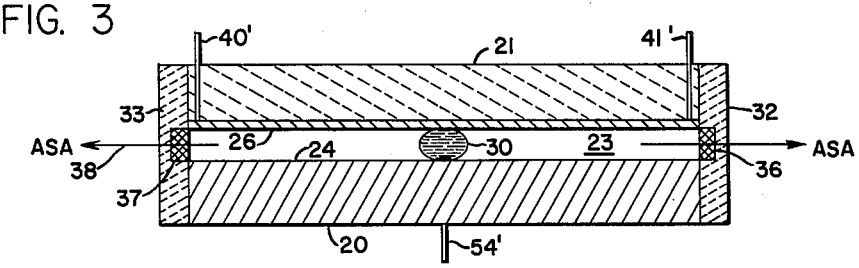
FIGURE 3 is a partial cross-section of the accelerometer of FIGURE 1 as viewed along section lines 3—3.

Suitable terminal mean are provided on the ends of the resistance means 26. Referring to FIGURES 2 and 4 the terminal means are identified by reference numerals 40 and 41. From a structural standpoint one of these terminals 41 is depicted in FIGURE 1 as being a terminal member mounted on the cover plate 13. A lead 41' extends from the terminal 41 to one end of the resistance means 26 as indicated in FIGURES 1 and 3. It should be noted that terminal 41 is insulated from cover plate 13, however, this is not shown in the drawing.

FIGURE 4 shows the schematic representation of the electrical connections to the accelerometer means shown in FIGURES 1, 2 and 3. The resistance means 26, the seismic mass element 30, and the conductor element 20 (the opposed face 24 thereof) are schematically illustrated. The conductor element 20 and the resistance means 26 are shown schematically to be spaced apart in a parallel arrangement and with the seismic mass element 30 bridging or electrically connecting the conductor element 20 and the resistance means 26 together at its point of contact therewith. It should be pointed out that the magnetic flux is directed out of and perpendicular to the plane of the paper in FIGURES 3 and 4, so that a current directed through seismic mass element 30 is flowing in a direction perpendicular to the direction of the magnetic flux. A suitable source of alternating current is provided. In FIGURE 4 this source takes the form of a transformer 42 comprising a primary winding 43 and a secondary winding 44. Secondary winding 44 is center tapped as at 45 and connected to ground 46. The terminals at the two ends of the secondary winding 44 are identified by reference numerals 47 and 48. A diode or rectifier 50 connects terminal 48 of secondary winding 44 to terminal 40 of resistance means 26. A diode or rectifier 51 connects terminal 41 of resistance means 26 to terminal 47 of secondary winding 44. The diodes 50 and 51 are arranged so as to permit the flowing of current only in one direction around the group including the secondary winding 44, diode 50, resistance means 26, and diode 51. The conductor element 20 is connected to ground 46 through a suitable output resistor means 52. Primary winding 43 of transformer 42 is adapted to be energized by a suitable source of voltage 53.

In operation of the apparatus disclosed in FIGURES 1–4, energization of the transformer 42 from source 53 will result (assuming the absence of any acceleration along the ASA 38) in the seismic mass element 30 assuming a normal or null position such as is shown in FIGURES 2 and 3. It may be assumed that upon initial energization the seismic mass element is at some position other than its null position. For this situation, unequal currents will flow through the conductive seismic mass element 30. To explain, assume an instantaneous polarity of transformer secondary winding 44 as depicted in FIGURE 4. As shown terminal 48 has a positive polarity with respect to terminal 47. For this polarity, current depicted in FIG. 4 as $i_1$ flows from terminal 48 through diode 50, terminal 40, a portion of resistance means 26 to the point of engagement of seismic mass element 30 therewith, seismic mass element 30, conductor element 20, and output resistance means 52 to ground 46. A second current depicted as $i_2$ simultaneously flows from ground 46 through output resistor means 52, conductor element 20, seismic mass element 30, the remaining portion of resistance means 26, terminal 41, diode 51, to terminal 47 of secondary winding 44. It will be noted that current $i_1$ and $i_2$ are flowing in opposite directions through the seismic mass element 30 and the output resistor means 52. For the stated condition of equilibrium it was assumed that the seismic mass element 30 was not centered electrically with respect to the resistance means 26. Accordingly currents $i_1$ and $i_2$ will be of different magnitudes leaving a net current flowing through the seismic mass 30 and the output resistor means 52. This net current ($i_1$ minus $i_2$) flowing at right angles (perpendicular) to the magnetic flux field in passage 23 causes a force to be applied to the seismic mass element 30 in a direction tending to move it along the passage 23 to a position where it will be electrically centered with respect to the resistance means 26. This force is a result of the interaction between the current flowing through the conductive seismic mass element 30 and the magnetic flux field existing at right angles thereto across the gap defined between the pole pieces 15 and 16. This is known in the art as the Faraday pump principle, it being understood that the force produced is at right angles to both the flux and the current. On the opposite half cycle of energization, that is when terminal 48 has a negative polarity with respect to terminal 47, no current can flow due to the blocking action of the diodes or rectifiers 50 and 51.

It has therefore above been shown that upon initial energization (in the absence of accelerational disturbances along the ASA 38) that the seismic mass element 30 will be forced to an electrically centered position with respect to the ends of the resistance element 26. At this electrically centered or normal position the net current flowing through seismic mass element 30 and output resistor means 52 is essentially zero, consequently output resistance means 52 dissipates essentially no power.

Assume now that an acceleration (either positive or negative) is applied to the accelerometer 10 along the ASA 38. This will tend to cause a relative movement between the seismic mass element 30 and the elements which collectively define or form the passage 23. The relative movement takes place along the ASA 38. As long as the seismic mass element 30 is at its null position the currents $i_1$ and $i_2$ are equal and opposite so that there is a net force of zero acting on the seismic mass element 30 and further there is no output signal $e_0$ developed at the output terminals 54 and 55. However, when the accelerational disturbance is applied to the device thus causing relative movement to occur between the seismic mass element 30 and the elements defining or forming passage 23, currents $i_1$ and $i_2$ are no longer equal. Again there will be a net current flowing through the seismic mass element 30 and the output resistor means 52. The direction of this current will be determined by the sense of the applied acceleration and the magnitude of the force produced on the seismic mass will be a function of the magnitude of the applied acceleration and will be in a direction tending to return the seismic mass element 30 back to its normal position. For any given level of acceleration applied to the seismic mass, the seismic mass will take a position of equilibrium at which time accelerational force is opposed by a rebalance force of equal magnitude. The seismic mass will remain in the position as long as the accelerational force remains at that level. If the accelerational force becomes greater, then the seismic mass will deviate or move further away from its normal null position and conversely if the accelerational force decreases the seismic mass will be moved toward its null position by the Farady action above described. Finally, when the accelerational force decreases to zero, the seismic mass element once again is at its null signal producing position. It will be understood that when the seismic mass element 30 is displaced away from its normal position by the application of acceleration the net current flowing therethrough, in addition to providing the rebalance force, also simultaneously is flowing through the output resistor means 52 so as to develop thereacross an output voltage $e_0$. The polarity and magnitude of the current are indicative respectively of the sense and magnitude of the applied accelerational disturbance.

It has been found that the proper selection of the size of the passageway 23 and the volume of the globule of conductive liquid 30 collectively renders the accelerometer substantially immune to cross accelerations. These cross accelerations by definition would be accelerations having a component perpendicular to the ASA 38. It will be understood that it is undesirable to have the globule of conductive liquid 30 become disengaged from either the resistance means 26 or the conductor 20. Therefore, the proper proportioning of the seismic mass 30 and the passageway 23 serves to always keep the seismic mass 30 in electrical engagement with the conductor element 20 and the resistance means 26, even in the presence of strong cross accelerations.

The advantages of the apparatus thus far described are several. The electronics or electrical circuitry required to provide a useable output signal indicative of applied acceleration are extremely simple in comparison to the complex arrangements presently used in the industry. Also the present invention provides a linear output signal and is immune from vibrational errors. There is substantially no elastic restraint acting upon the seismic mass, the only restraint on the mass being that intentionally produced by the Faraday pump principle above explained. There is no net force acting on the seismic mass element when it is in its null position as compared to some present accelerometer devices which may have forces and/or torques acting on the seismic mass at its null position which are very undesirable. In addition, the present invention provides a very low output impedance which is desirable in many cases.

Figure 5:
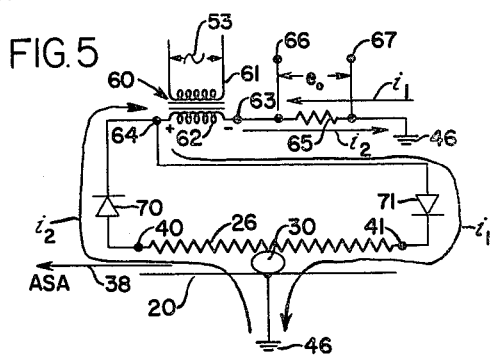
FIGURE 5 is a schematic diagram of an electrical connection of the accelerometer of FIGURES 1, 2 and 3.

FIGURE 5 depicts an alternate embodiment of the invention. The acceleration sensor per se used in the arrangement shown in FIGURE 5 would be similar to that used in FIGURES 1–3 and accordingly similar reference numerals have been used to represent the resistance or contact means 26, seismic mass element 30, and the conductor element or contact means 20. It should be understood that a magnetic flux field is directed across passage 23, that is, directed perpendicular to the plane of the paper of FIGURES 3 and 5. In this embodiment, a transformer 60 is provided including a primary winding 61 and a secondary winding 62. A first terminal 63 of the secondary winding 62 is connected to ground 46 through an output resistor means 65 having a pair of terminals 66 and 67 on opposite ends thereof. The other terminal 64 of the secondary winding 62 is connected to terminals 40 and 41 on the opposite ends of the resistance means 26 through a pair of suitable diodes or rectifiers 70 and 71. The diodes 70 and 71 are arranged so that they permit current flow only in one direction around the group which includes the resistance means 26, terminal 40, diode 70, terminal 64, diode 71, and terminal 41. The conductor element 20 is connected by suitable means to ground 46.

In operation, the system depicted in FIGURE 5 results in current flowing through the diodes 70 and 71 on an alternate basis in contrast to the simultaneous conduction of current through the diodes 50 and 51 for the system depicted in FIGURE 4. When terminal 64 of secondary winding 62 of the transformer 60 is positive as shown in FIGURE 5, a current $i_1$ flows from terminal 64 through diode 71, terminal 41, the portion of resistance means 26 between terminal 41 and the seismic mass element 30, seismic mass element 30, ground 46, output resistor means 65, to terminal 63 of the secondary winding. One half cycle, 180 electrical degrees, later when terminal 63 is positive with respect to terminal 64 then current $i_2$ flows from terminal 63 through output resistor means 65, ground 46, conductor element 20, seismic mass element 30, the remaining portion of resistance means 26, terminal 40, and diode 70 to terminal 64. It will be understood that the current flowing through seismic mass element 30 is directed perpendicular to the direction of the magnetic flux field across passage 23 and a force is applied to the seismic mass element 30, which is at right angles to the direction of the current ($i_1$ or $i_2$) and at right angles to the direction of the magnetic flux field. The force is directed so as to tend to move the seismic mass element towards its null or electrically centered position.

The conduction of the diodes 70 and 71 on an alternate basis causes currents $i_1$ and $i_2$ to flow through seismic mass element 30 on an alternate basis. This alternate flowing of currents $i_2$ and $i_1$ through the conductive liquid seismic mass element 30 tends to produce a "bunching" action on the seismic mass per se. This action may be considered a tendency of the force developed due to the interaction of the current ($i_1$ or $i_2$) and the magnetic flux field, to compress the globule of conductive liquid first from one axial end thereof and one half cycle later, from the other axial end thereof. This action is desirable from the standpoint that it tends to squeeze the globule of conductive liquid into intimate contact or engagement with the resistance means 26 as well as the inner face 24 of the conductor element 20. This good contact is further enhanced by making the dimension of the passage 23 between inner face 24 and resistance means 26 relatively smaller than the dimension the globule of conductive material would assume in the absence of any restraint thereon. In addition, the alternating current flowing through the globule of conductive liquid 30 tends to maintain the liquid in a constant state or agitation with respect to the stationary conductor element 20 and the resistance means 26. This has been found desirable from the standpoint of increasing the sensitivity of the device to respond to accelerations along the ASA 38.

The output resistor means 65 has an alternating voltage developed thereacross, to be measured at output terminals 66 and 67, for all conditions of the device being energized, even when the seismic mass element 30 is in its electrically centered position with respect to the resistance means 26. For that electrically centered position where $i_1$ is equal and opposite to $i_2$, but where the currents $i_1$ and $i_2$ do not flow simultaneously, there is an effective alternating voltage $e_0$ produced at this time and output resistor means 65 dissipates a finite amount of power. The time integral of this voltage over 360 electrical degrees would be zero. However, when acceleration causes the seismic mass element 30 to move relative to the resistance means 26 along the ASA 38, then $i_1$ and $i_2$ are no longer equal and opposite and accordingly the time integral of the output voltage $e_0$ over 360 electrical degrees would not be zero. On the contrary, the time integral of the output voltage would have a net value either positive or negative with respect to a reference as a function of the sense of the applied acceleration and the magnitude of the output voltage would be indicative of the magnitude of the applied acceleration. In other respects the system depicted in FIGURE 5 functions in a similar manner to that of FIGURE 4 in that the currents $i_1$ and $i_2$ provide a rebalancing force acting on the seismic mass 30 tending to oppose acceleration forces acting thereon in returning the seismic mass element 30 to its null signal producing position when all external accelerations cease.

Figure 6:
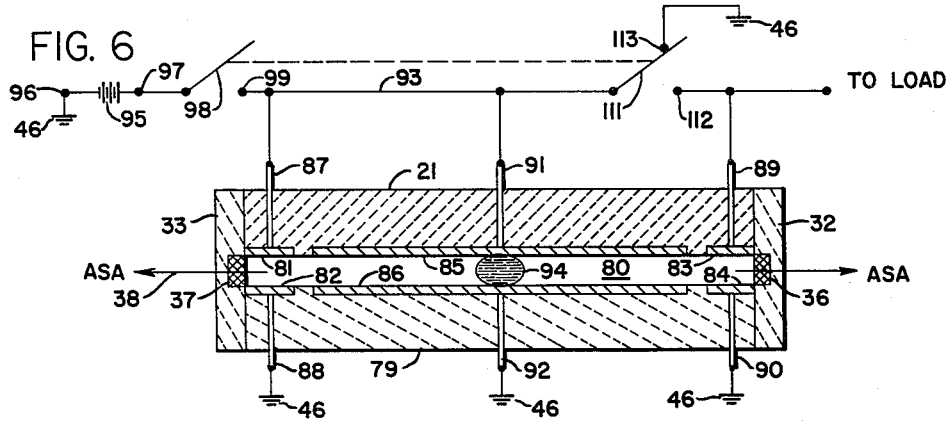
FIGURE 6 is a partial cross-sectional view of an alternate embodiment of the present invention with the electrical connections shown schematically.

FIGURE 6 depicts an alternate configuration of the present invention. In general, the device of FIGURE 6 is similar to that of FIGURES 1-3 to the extent that the basic support or housing means 11 and magnetic flux producing means could be the same, it being understood that suitable means are provided for causing a flux field to exist across the passage perpendicular to the plane of the paper of FIGURE 6. Certain differences do occur however, in the components defining the passage. In FIGURE 6 the passage is identified by reference numeral 80. The resistance means 26 of the resistance element (by definition, the combination of the resistance means 26 and the insulator element 21) and the conductor element 20 of FIGURES 1-3 have been replaced by three sets of contacts and by an element of a suitable insulative material (such as ceramic) having the same general configuration as the conductor element 20. This element is identified by reference numeral 79. The first set of contacts 81 and 82 are arranged at one end of the passage 80, are electrically insulated from one another, are depicted as being generally on diametrically opposite sides of the passage 80, and have the same general axial position with respect to the ASA 38. As depicted the contacts 81 and 82 have a fairly short axial extent. The second set of contacts are identified by reference numerals 83 and 84 and are positioned at the other end of the passage 80. The contacts 83 and 84 are electrically insulated from one another, are generally on diametrically opposite sides of the passage 80, have a generally short axial extent, and have the same general axial position with respect to the ASA 38 defined by the passage 80. The third set of contacts are designated by the reference numerals 85 and 86. The contacts 85 and 86 are positioned intermediate the first and second set of contacts 81-82 and 83-84 respectively. As depicted, the contacts 85 and 86 have a considerable axial extent and are similar to contacts 81-84 in that they are electrically insulated from one another, are disposed on generally diametrically opposite sides of the passage 80, and have the same general axial position relative to the ASA 38. A plurality of terminals 87, 88, 89, 90, 91 and 92 are connected respectively to contacts 81-86. Contacts 88, 90 and 92 are adapted to be grounded as at 46 and contacts 87 and 91 are electrically connected together by connection lead 93. Contact 89 is electrically connected to contacts 87 and 91 by lead 93 through switching means 111 and its associated contact 112. When switching means 111 is operated to disconnect contact 89 from contacts 87 and 91, it engages contact 113 which connects switch means 111 to ground 46 by suitable means. A seismic mass element 94 is disposed in the passage 80 and may well be identical to the seismic mass element 30 depicted in FIGURES 1-3. A source of direct current 95 is provided having one terminal 96 grounded as at 46 and the other terminal 97 connected to one side of a suitable switching means 98. The switch means 98 has a contact 99 electrically connected to the lead 93. In addition, switching means 98 is mechanically linked to switching means 111 such that, when switching means 98 is engaging contact 99, switching means 111 is engaging contact 112; and when switching means 98 is disengaged from contact 99, switching means 111 is engaging contact 113. Accordingly, when the switching means 98 is engaging its associated contact 99 and switching means 111 is engaging its associated contact 112, a potential is applied between contacts 81 and 82, between contacts 83 and 84, and between contacts 85 and 86. The connection lead 93 interconnecting the three contact terminals 87, 89 and 91 is further adapted to be connected to a suitable load device according to the intended purpose.

The apparatus depicted in FIGURE 6 is adapted to function as an integrating accelerometer or velocity indicator. The device is prepared for operation as an acceleration integrator by initially operating switch means 98 and 111 so that the voltage potential is applied across contacts 81-82, 83-84, and 85-86. This performs a "caging" function in that, regardless of the initial position of the seismic mass element 94 in the passage 80 a force will be developed on the seismic mass due to the interaction of the current flowing therethrough at right angles to the magnetic flux field. For example, if the seismic mass element were initially in the position as shown in FIGURE 6 namely in engagement electrically with contacts 85 and 86, the current would flow from terminal 97 of the battery 95 through switch 98, contact 99, lead 93, terminal 91, contact 85, seismic mass element 94, contact 86, terminal 92, ground 46, to terminal 96 of battery 95. The polarity of the battery or source of direct current 95 is arranged so that the resultant force produced on the seismic mass 94 will move it to the left as shown in FIGURE 6 to a final position at which it is in engagement with the first set of contacts 81 and 82. It will be understood that if seismic mass 94 had initially been to the far right of the passage depicted in FIGURE 6, the above recited circuit would be altered with current initially flowing from terminal 97 of the battery 95 through switch 98, contact 99, a portion of lead 93, switch 111, contact 112, a portion of lead 93, terminal 89, contact 83, seismic mass element 94, contact 84, terminal 90, ground 46, to terminal 96 of battery 95. This would impart an initial force to the seismic mass moving it from engagement with contacts 83 and 84 into a new position where it engages the contacts 85 and 86, which in turn would then function as in the first assumed state for continuing the movement of the seismic mass element 94 to the final caged position where it is in electrical engagement with the first set of contacts 81 and 82. It will be understood that as long as the switch means 98 and 111 are in engagement with their associated contacts 99 and 112, the seismic mass element 94 will be held by the electromechanical forces acting thereon in the caged position between contacts 81 and 82.

The switching means 98 and 111 are disengaged from their associated contacts 99 and 112 and switching means 111 is engaging contact 113 when it is desired for the device depicted in FIGURE 6 to operate. This electrically uncages the seismic mass element 94 rendering it free to respond to accelerations of one sense which would tend to move the seismic mass 94 relative to the structure defining the passage 80 along the ASA 38. The movement of the seismic mass element 94 would be damped by an induced current effect as it moves along the passage 80. The damping occurs as a function of the interaction of the induced current directed through the mass element perpendicular to the magnetic flux field. The induced currents are produced by the motion of a conductor, the seismic mass element 94, moving through the magnetic flux field. The induced currents are conducted from seismic mass element 94 through contact 85, terminal 91, lead 93, switching means 111, contact, 113, ground 46, terminal 92, contact 84 and back to seismic mass element 94 and due to the interaction of the current through the mass element 94 perpendicular to the magnetic flux field, a damping force is applied to the mass element 94 tending to restrain the initial movement caused by the applied acceleration. The addition of the damping function which tends to retard the relative movement of the seismic mass element 94 along the passage 80 results in the displacement of the seismic mass 94 becoming proportional to the time integral of the applied acceleration or in other words velocity. It will therefore be understood that the output contacts 83 and 84 which represent a fixed displacement of the seismic mass relative to the elements defining the passage 80 accordingly also provide a means for actuating a suitable load means, the actuation being representative of a predetermined velocity. It will further be understood that the length of the passage 80 can be selected as a function of the particular velocity setting that is desired for the control signal; the control signal, in effect, being produced when the seismic mass element 94 travels to the far right as shown in FIGURE 6 electrically engaging the output contacts 83 and 84. The damping produced by the induced current effect may be further augmented or replaced by gas damping if desired. This would include placing suitable restrictions in the channel 80 and its associated gas return port which would restrict, to the desired amount, the free flow of gas therethrough.

The acceleration integration means depicted in FIGURE 6 has several advantages as compared to previous acceleration integrators. The use of the seismic mass per se for completing a switching function is very advantageous as compared to some prior art devices which included in part, various relations between the seismic mass and the switching means. Further, the present device has excellent accuracy since the response to acceleration applied thereto is determined by physical constants which are not critically affected by the environments.

Figure 7:
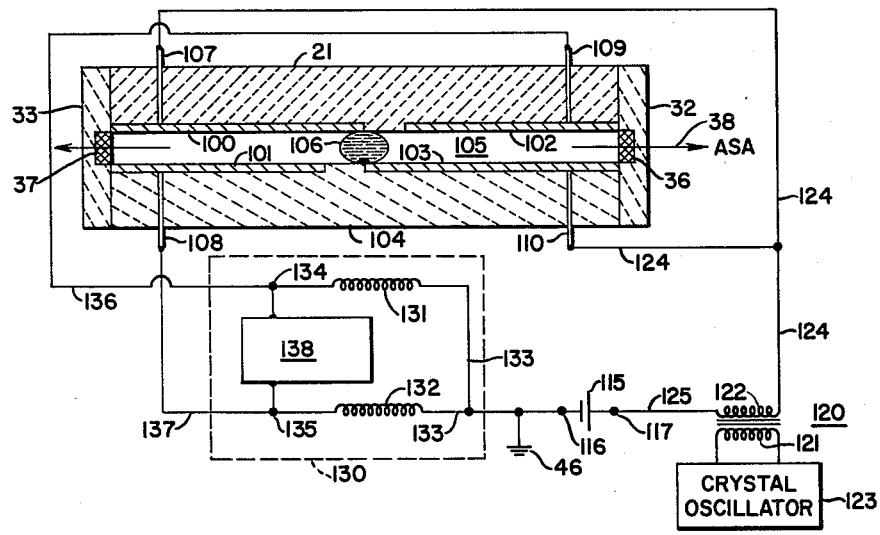
FIGURE 7 is a partial cross-sectional view of still another embodiment of the instant invention utilizing a digital output with the electrical connections shown schematically.

FIGURE 7 depicts still a further embodiment of the invention and comprises a motion sensing apparatus utilizing the same basic magnetic flux producing means as is depicted in FIGURES 1–3. Accordingly in FIGURE 7 a partial cross-section of the device and the passage is shown. It should be understood that suitable means are provided for causing a flux field to exist across the passage perpendicular to the plane of the paper of FIGURE 7. Resistance means 26 of the resistance element (by definition, the combination of the resistance means 26 and the insulator element 21) and conductor element 20 as illustrated in FIGURE 3 are replaced by four contacts 100, 101, 102 and 103 and a suitable insulative insert 104, such as ceramic, having a configuration essentially the same as conductor element 20. The contacts 100 and 101 may be considered first and second contacts disposed to one side of a plane (not shown) which cuts the passage, identified in this figure by the reference numeral 105, perpendicular to the ASA 38 thereof. The contacts 102 and 103 may be considered as being third and fourth contacts disposed to the other side of the plane. All of the contacts 100–103 are electrically insulated from one another. The contacts 100 and 101 are depicted as being disposed on diametrically opposite sides of the passage 105 so that current passing therethrough (assuming that the seismic mass 106 disposed in the passage 105 is in engagement therewith) would be at right angles to the flux field across the passage 105 as described above. In the same manner, contacts 102 and 103 are arranged on diametrically opposite sides of the passage 105 and, when engaged by seismic mass 106, would permit the passage therebetween of current flowing at substantially right angles to the flux field. The contacts 100 and 103 respectively, have a greater axial extent than their coacting contacts 101 and 102 respectively. More specifically, the contacts 100 and 103 are generally arranged and characterized so that they each begin at the same general axial point in the passageway 105 relative to the ASA 38, and extend in opposite directions from said point axially along the sides of the passage 105. The contacts 101 and 102 are not immediately adjacent said axial point in the passage 105 but, on the contrary, commence at points somewhat removed therefrom and extend axially along the passage 105.

A plurality of terminals 107, 108, 109, and 110 are connected respectively, to contacts 100–103. A source of direct current 115 is provided, having a first terminal 116 connected to ground 46 and a second terminal 117. A coupling transformer 120 is provided, including a primary winding 121 and a secondary winding 122. Primary winding 121 is connected to a suitable source of electrical oscillations such as a crystal controlled oscillator means 123. The first and fourth contacts 100 and 103 are connected to terminal 117 of battery 115 through a suitable connection lead 124, secondary winding 122, and a lead 125.

A suitable alternating cycle counting means 130 is provided. Any suitable alternating cycle or pulse counting means may be provided. In FIGURE 7 the counting means 130 is somewhat schematically depicted as including a pair of high frequency choke coils 131 and 132. One end of each of the coils 131 and 132 is connected to ground 46 through suitable connection lead 133. The other end of coil 131 is identified by terminal 134 and the other end of coil 132 is identified by terminal 135. Terminal 134 is connected to terminal 109 and thus to the third contact 102 adjacent the passage 105 by a lead 136. Also terminal 135 is connected by a lead 137 to terminal 108 and thus to the second contact 101 adjacent the passage 105.

In operation of the apparatus shown in FIGURE 7, the source of direct current 115 is effective to maintain the seismic mass 106 at substantially a neutral or non-signal producing position as at the center of the passage 105 as shown in the drawing. Actually the seismic mass 106 in the absence of any acceleration along the ASA 38 will tend to oscillate back and forth about its null position due to the following action. Assuming that the seismic mass element 106 was engaging the first and second contacts 100 and 101, then a direct current could pass through the seismic mass from contact 100 to contact 101 at right angles to the magnetic flux field and this would produce a force tending to move the seismic mass element 106 to the right as shown, from a point where it engages contacts 100 and 101 to a new position where it is engaging electrically the third and fourth contacts 102 and 103. The seismic mass element 106 now has a current of the opposite direction passing therethrough and accordingly has a force applied to it tending to move it to the left as shown and back into contact with the first and second contacts 100 and 101. This slight oscillation or jittering of the seismic mass will continue maintaining the seismic mass at an average position as shown in FIGURE 7.

When acceleration is applied along the ASA 38 defined by the passage 105, the seismic mass element 106 will tend to leave the position as shown and move either to the right or to the left depending upon the sense of the acceleration. The contacts 101 and 102 are arranged as indicated so that they are slightly axially displaced away from this neutral position. If the seismic mass element 106 moves to the left slightly as shown in FIGURE 7 then it will become effective to electrically connect the first and second contacts 100 and 101 respectively. Conversely, if the seismic mass element 106 moves to the right as shown, then it becomes effective to electrically connect the third and fourth contacts 102 and 103 respectively.

In operation, the application of acceleration to the device along the ASA 38 will cause relative movement to occur between the seismic mass 106 and the elements defining or forming passage 105. If the seismic mass moves to the left as shown in FIGURE 7 then a circuit is complete from terminal 117 of the battery 115 through lead 125, secondary winding 122, lead 124, terminal 107, contact 100, seismic mass element 106, contact 101, terminal 108, lead 137, terminal -135, coil 132, lead 133, to ground and terminal 116 of the battery. The crystal oscillator 123 serves the function of superimposing a fixed high frequency alternation upon the direct current flowing through the above described circuit. The high frequency choke coils offer substantially no impedance to the flow therethrough of direct current but do offer substantial impedance to the high frequency oscillations induced into the above described circuit through the transformer 120 and accordingly the terminal 135. For this set of conditions a voltage will be developed having the same frequency as that coupled into the circuit from the crystal oscillator 123. It will be understood that if the initial accelerational disturbance had been to cause the seismic mass element 106 to move to the right as shown in FIGURE 7, thus electrically engaging the third and fourth contacts 102 and 103, a slightly different circuit would be completed for the flow of direct current having a high frequency component superimposed thereon which current would flow through the high frequency coil 131 instead of the coil 132. This circuit would be traced from terminal 117 of the battery 115 through lead 125, secondary winding 122, lead 124, terminal 110, contact 103, seismic mass element 106, contact 102, terminal 109, lead 136, terminal 134, coil 131, and lead 133 to ground 46.

It will thus be understood that at terminlas 134 and 135 will appear high frequency oscillations under certain conditions. When no acceleration is being applied to the device depicted in FIGURE 7, then neither terminal 134 or 135 will have any high frequency signal present. However, for an acceleration causing the seismic mass to omve to the left as shown in FIGURE 7 it arbitrarily may be designated a positive acceleration. It has been demonstrated how high frequency voltage will appear at terminal 135. It has further been indicated how an acceleration of the opposite sense or a negative acceleration will cause a high frequency voltage to be developed at terminal 134. A suitable pulse counting means 138 is adapted to be connected to the terminals 134 and 135 and will function to subtract the absolute values of the pulses received at terminals 134 and 135. It will be understood that the difference in count will be proportional to the input.

It will be understood from the above discussion of the system shown in FIGURE 7 that with no input acceleration, the energy imparted to the seismic mass element 106 will be proportional to the dwell time of the mass at each set of contacts 100-101 and 102-103. Since the mass has to maintain an average position as shown, it follows that the force imparted to the mass will be zero. For an applied acceleration, the difference in dwell time of the mass element 106 at the sets of contacts 100-101 and 102-103 will be proportional to the applied acceleration and further, the numerical differences in pulse counts will also be proportional to the applied acceleration. It therefore follows that the total numerical difference in pulse counts becomes a measure of the time integral of the applied acceleration or in other words is proportional to velocity.

In the disclosed system, the oscillation of the seismic mass as above described under the zero acceleration condition, will not necessarily be synchronous with the frequency of oscillation of the oscillator 123 and accordingly may induce a slight counting error. However, it has been found that by making the frequency of oscillation of the oscillator 123 suitably high such as in the neighborhood of 100 kilocycles, this error will be minimized so that it will not cause any adverse effects.

While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What I claim is:

1. A linear accelerometer comprising: a hollow soft iron container; a permanent magnet; a pair of pole pieces, said container, said permanent magnet, and said pole pieces being connected together such that said pole pieces are positioned contiguously in a spaced relationship defining an elongated gap therebetween, and said permanent magnet being effective to cause magnetic flux to flow between said pole pieces such that a substantially uniform magnetic flux field is set up in said elongated gap; a resistance element positioned adjacent to said elongated gap and cooperating with said pole pieces to form an elongated channel therebetween; a conductor element positioned adjacent to said channel and cooperating with said pole pieces and said resistance element to form an elongated passage therebetween; a liquid metal seismic mass element positioned within said passage and adapted to move axially along and relative to said elements forming said passage in response to accelerations along said passage, said seismic mass element having a normal position at the center of said passage, and said pole pieces being electrically insulated from said mass element, said resistance element, and said conductor element; a gas return port connecting the ends of said passage; and a filter element positioned in said gas return port adjacent to each end of said passage and preventing said mass element from entering said gas return port; means for connecting said resistance element to a source of alternating current, and said resistance element, said seismic mass element, and said conductor element being electrically connected and defining a current path.

2. A linear accelerometer comprising: a hollow soft iron container; a permanent magnet; a pair of pole pieces; said container, said permanent magnet, and said pole pieces being positioned together such that said pole pieces are positioned contiguously in a spaced relationship defining an elongated gap therebetween; said permanent magnet being effective to cause magnetic flux to flow between said pole pieces such that a substantially uniform magnetic flux field is set up in said gap; a resistance element; a conductor element; said pole pieces, said resistance element, and said conductor element being positioned together to form an elongated passage therebetween; a liquid metal seismic mass element positioned within said passage and being electrically connected with said resistance element and said conductor element; said pole pieces being electrically insulated from said resistance element, said seismic mass element, and said conductor element; said seismic mass element having a normal position at the center of said passage and being adapted to move axially along and relative to said elements forming said passage in response to accelerations along said passage means for connecting said resistance element to a source of alternating current; a gas return port connecting the ends of said passage; and a filter element being positioned in said gas return port adjacent to each end of said passage and preventing said mass element from entering said gas return port.

3. A linear accelerometer comprising: a support; a permanent magnet; a pair of pole pieces; said support, said permanent magnet, and said pole pieces being connected together so that said pole pieces are positioned contiguously in a spaced relationship defining an elongated gap therebetween, said permanent magnet being effective to cause magnetic flux to flow between said pole pieces such that a substantially uniform magnetic flux field is set up in said gap; a resistance element positioned adjacent to said elongated gap, and cooperating with said pole pieces to form an elongated channel therebetween; a conductor element positioned adjacent to said channel and cooperating with said pole pieces and said resistance element to form an elongated passage therebetween; a conductive liquid seismic mass element positioned within said passage and adapted to move axially along and relative to said elements forming said passage in response to accelerations along said passage; means electrically insulating said pole pieces from said mass element, said resistance element, and said conductor element; a gas return port connecting the ends of said passage; and a filter element being positioned in said gas return port adjacent to each end of said passage and preventing said mass element from entering said gas return port; means for connecting said resistance element to a source of alternating current; said resistance element, said mass element, and said conductor element defining a current path.

4. A linear accelerometer comprising: a container; a source of magnetic flux; a pair of pole pieces; said container, said source of magnetic flux, and said pole pieces being connected together such that said pole pieces are positioned contiguously in a spaced relationship defining a gap therebetween and said source of magnetic flux is effective to cause magnetic flux to flow between said pole pieces; a resistance element; a conductor element; said pole pieces, said resistance element, and said conductor element being positioned to form an elongated passage therebetween; an electrically conductive seismic mass element positioned within said passage and having a normal position at the center of said passage, said seismic mass element being adapted to move axially along and relative to said elements forming said passage in response to accelerations along said passage, and said seismic mass element being further adapted to electrically connect said resistance element and said conductor element; said pole pieces being electrically insulated from said mass element, said resistance element, and said conductor element; means for connecting said resistance element to a source of current; a gas return port connecting the ends of said passage; and a filter element positioned in said gas return port adjacent to each end of said passage.

5. A linear accelerometer comprising: a support; a permanent magnet; a pair of pole pieces; said support, said permanent magnet, and said pole pieces being connected together so that said pole pieces are positioned contiguously in a spaced relationship defining an elongated gap therebetween, said permanent magnet being effective to cause magnetic flux to flow between said pole pieces such that a substantially uniform magnetic flux field is set up in said elongated gap; a resistance element positioned adjacent to said air gap, said resistance element cooperating with said pole pieces to form an elongated channel therebetween; a conductor element positioned adjacent to said channel and cooperating with said pole pieces and said resistance element to form an elongated passage therebetween; a conductive seismic mass element positioned within said passage, said seismic mass element having a normal position at the center of said gap and adapted to move axially along and relative to said elements forming said passage in response to accelerations along said passage; means electrically insulating said pole pieces from said mass element, said resistance element, and said conductor element; a gas return port connecting the ends of said passage; a filter element positioned in said gas return port adjacent to either end of said passage and preventing said mass element from entering said gas return port; a source of alternating current; means connecting said alternating current source to said resistance element; an output means; means connecting said output means to said conductor element; and means connecting said output means to said current source, a current path being completed from said current source through said resistance element, said seismic mass element, said conductor element, and said output means back to said current source, the axial displacement of said seismic mass element from said normal position upon acceleration of said support along said passage being effective to cause an increase in the average current through said current path which is proportional to the linear acceleration of said support, the voltage across said output means being indicative of the linear acceleration of said support, and the interaction of said current through said mass element within said magnetic flux field being effective to cause a rebalancing force to be exerted on said mass element tending to force said mass element back to said normal position.

6. A linear accelerometer comprising: a container; a source of magnetic flux; a pair of pole pieces; said container, said source of magnetic flux, and said pole pieces being connected together such that said pole pieces are positioned contiguously in a spaced relationship defining a gap therebetween, and said source of magnetic flux being effective to cause magnetic flux to flow between said pole pieces; a resistance element; a conductor element; said pole pieces, said resistance element, and said conductor element being positioned to form an elongated passage therebetween; an electrically conductive seismic mass element being positioned within said passage and having a normal position at the center of said passage, said seismic mass element being adapted to move axially along and relative to said elements forming said passage in response to accelerations along said passage, said seismic mass element being further adapted to electrically connect said resistance element and said conductor element, said pole faces being electrically insulated from said mass element, said resistance element, and said conductor element, and said resistance element being adapted to be connected to a source of current; a gas return port connecting the ends of said passage; a filter element positioned in said gas return port adjacent to each end of said passage; a source of alternating current; means connecting said resistance element to said current source; an output means; and means connecting said conductor element with said output means, a current path being completed from said current source through a portion of said resistance element, through said seismic mass element, through said conductor element, through said output means, and back to said current source, the axially displacement of said mass element from said normal position upon acceleration of said container along said passage being effective to cause an increase in the average current through said current path which is proportional to the linear acceleration of said container, the voltage across said output means being indicative of the linear acceleration of said container, and the interaction of said current through said mass element located in a magnetic flux field being effective to cause a rebalancing force to be exerted on said mass element tending to force said mass back to said normal position.

7. A linear accelerometer comprising: a support; a flux producing means, said support and said flux producing means being connected together so as to define an elongated gap therebetween, and said flux producing means being effective to cause magnetic flux to flow in said gap; a resistance element and a conductor element positioned adjacent to said elongated gap and cooperating therewith to form an elongated passage therebetween; a conductive seismic mass element positioned within said passage, and having a normal position at the center thereof, said seismic mass element electrically connected to said elements and adapted to move axially along and relative to said elements forming said passage in response to accelerations along said passage; a source of alternating current; means connecting said resistance element to said current source; an output means; and means connecting said conductor element with said output means, a current path being completed from said current source through said resistance element, said seismic mass element, said conductor element, said output means, and back to said current source, the axial displacement of said mass element from said normal position upon acceleration of said container along said passage being effective to cause an increase in the average current through said current path which is proportional to the linear acceleration of said container, the voltage across said output means being indicative of the linear acceleration of said container, and the interaction of said current through said mass element located in a magnetic flux field being effective to cause a rebalancing force to be exerted on said mass element tending to force said mass back to said normal position.

8. Motion sensing apparatus comprising: a magnetic core structure including an elongated gap therein; magnetic flux producing means associated with said core structure and effective to cause magnetic flux to bridge said gap; means including first contact means and second contact means positioned adjacent to said gap and cooperating therewith to form an elongated passage therebetween; a conductive liquid seismic mass element positioned within said passage, adapted to move relative to said means forming said passage along said axis in response to accelerations along said passage, and adapted to electrically connect said first and said second contact means; alternating current means; means including a pair of rectifying means connecting said first contact means and said alternating current means; output means; and means connecting said output means to said second contact means and to said alternating current means.

9. Motion sensing apparatus comprising: a magnetic core structure including an elongated gap therein; magnetic flux producing means associated with said core structure and effective to cause magnetic flux to bridge said gap; means including resistance means and conductor means positioned adjacent to said gap and cooperating therewith to form an elongated passage therebetween, a conductive seismic mass element positioned within said passage, adapted to move relative to said means forming said passage in response to accelerations applied to said apparatus, and adapted to electriclly connect said resistance means and said conductor means; alternating current means; means including rectifying means connecting said resistance means and said alternating current means; output means; and means connecting said output means to said conductor means and to said alternating current means.

10. A linear accelerometer comprising: a support; a permanent magnet; a pair of pole pieces; said support, said permanent magnet, and said pole pieces being connected together so that said pole pieces are positioned contiguously in a spaced relationship defining an elongated gap therebetween, said permanent magnet being effective to cause magnetic flux to flow between said pole pieces such that a substantially uniform magnetic flux fiield is set up in said gap; first and second insulator elements positioned adjacent to said elongated gap and cooperating with said pole pieces to form an elongated passage therebetween; first, second, and third contact means mounted on said first insulator element; fourth, fifth, and sixth contact means mounted on said second insulator element, said contact means being positioned in said passage and electrically insulated from one another, said first and fourth contact means forming a first set of contacts and being positioned at one end of said passage, said second and fifth contact means forming a second set of contacts and being positioned at the other end of said passage, said third and sixth contact means forming a third set of contacts and being positioned intermediate said first and second sets of contacts; a conductive liquid seismic mass element positioned within said passage and adapted to move axially along and relative to said elements forming said passage in response to accelerations along said passage; said seismic mass element being further adapted to electrically connect said first set of contacts when adjacent thereto, to electrically connect said second set of contacts when adjacent thereto, and to electrically connect said third set of contacts when adjacent thereto; said first, second, and third sets of contacts being adapted to connect to a source of current; a gas return port connecting the ends of said passage; and a filter element being positioned in said gas return port adjacent to each end of said passage and preventing said mass element from entering said gas return port.

11. Motion sensing apparatus comprising: a magnetic core structure including an elongated gap therein; magnetic flux producing means associated with said core structure and effective to cause magnetic flux to bridge said gap; means positioned adjacent to said gap and cooperating therewith to form an elongated passage therebetween; first, second, third, and fourth, fifth, and sixth contact means, said contact means being positioned in said passage and being electrically insulated from one another, said first and second contact means forming a first set of contacts and being disposed at one end of said passage, said third and fourth contact means forming a second set of contacts and being disposed at the other end of said passage, said fifth and sixth contact means forming a third set of contacts and being disposed intermediate of said first and second sets of contacts; and an electrically conductive seismic mass element positioned within said passage, adapted to move axially along and relative to said means forming said passage in response to accelerations along said passage, and adapted to electrically connect said first and second contacts when adjacent thereto, to electrically connect said third and fourth contacts when adjacent thereto, and to electrically connect said fifth and sixth contacts when adjacent thereto.

12. Motion sensing apparatus comprising: a magnetic core structure including an elongated gap therein; magnetic flux producing means associated with said core structure and effective to cause magnetic flux to bridge said gap; means positioned adjacent to said gap and cooperating therewith to form an elongated passage therebetween; first, second, third and fourth contact means, said contact means being positioned in said passage and being electrically insulated from one another, said first and second contacts being disposed to one side of a plane cutting said passage and perpendicular to said passage, and said third and fourth contacts being disposed to the other side of said plane; and an electrically conductive seismic mass element positioned within said passage, adapted to move axially along and relative to said means forming said passage in response to accelerations along said passage, and adapted to electrically connect said first and second contacts when adjacent thereto and to electrically connect said third and fourth contacts when adjacent thereto.

13. Motion sensing apparatus comprising: a magnetic core structure including an elongated gap therein; magnetic flux producing means associated with said core structure and effective to cause magnetic flux to bridge said gap; means positioned adjacent to said gap and cooperating therewith to form an elongated passage therebetween; first, second, third, and fourth contact means, said contact means being positioned in said passage and electrically insulated from one another, said first and second contacts being disposed to one side of a plane cutting said passage and perpendicular to said passage, and said third and fourth contacts being disposed to the other side of said plane; a conductive seismic mass element positioned within said passage, adapted to move relative to said means forming said passage in response to accelerations along said passage, and adapted to electrically connect said first and second contacts when adjacent thereto and to electrically connect said third and fourth contacts when adjacent thereto; a source of direct current having two terminals; digital counting means; means connecting one of said terminals to said first and fourth contacts; means connecting said other terminal, said mounting means, and said second and third contacts, a direct current flowing from said source through a circuit so as to intersect said magnetic field, said circuit including said connection means, said first and second contacts, said counting means, and said seismic mass element when said element is electrically connecting said first and second contacts, said circuit including said connection means, said third and fourth contacts, said counting means, and said seismic mass element when said element is electrically connecting said third and fourth contacts; and means connected to said circuit means for superimposing a relatively high frequency alternating signal on said direct currents.

14. Motion sensing apparatus comprising: a magnetic core structure including an elongated gap therein; magnetic flux producing means associated with said core structure and effective to cause magnetic flux to bridge said gap; means positioned adjacent to said gap and cooperating therewith to form an elongated passage therebetween; first, second, third, and fourth contact means, said contact means being positioned in said passage and electrically insulated from one another, said first and second contacts being disposed to one side of a plane cutting said passage and perpendicular to said passage, and said third and fourth contacts being disposed to the other side of said plane; a conductive liquid seismic mass element positioned within said passage, adapted to move axially along and relative to said means forming said passing in response to accelerations along said passage, and adapted to electrically connect said first and second contacts when adjacent thereto and to electrically connect said third and fourth contacts when adjacent thereto; a source of direct current having two terminals; alternating cycle counting means; means connecting one of said terminals to said first and fourth contacts; means connecting said other terminal, said counting means, and said second and third contacts, a direct current flowing from said source through a circuit so as to intersect said magnetic field, said circuit including said connection means, said first and second contacts, said counting means, and said seismic mass element when said element is electrically connecting said first and second contacts, said circuit including said connection means, said third and fourth contacts, said counting means, and said seismic mass element when said element is electrically connecting said third and fourth contacts; and means connected to said circuit means for superimposing a relatively high frequency alternating signal on said direct currents, said conecting means of said counting means and said second and third contacts, and said counting means being characterized so that alternations counted when current flows through said third contact are subtracted from alternations counted when current flows through said second contact.

15. Motion sensing apparatus comprising: a magnetic core structure including an elongated gap therein; magnetic flux producing means associated with said core structure and effective to cause magnetic flux to bridge said gap; means positioned adjacent to said gap and cooperating therewith to form an elongated passage therebetween; first, second, third, and fourth contact means, said contact means being positioned in said passage and electrically insulated from one another, said first and second contacts being disposed to one side of a plane cutting said passage and perpendicular to said passage, and said third and fourth contacts being disposed to the other side of said plane; a conductive liquid seismic mass element positioned within said passage, adapted to move relative to said means forming said passage along said passage in response to accelerations along said passage, and adapted to electrically connect said first and second contacts when adjacent thereto and to electrically connect said third and fourth contacts when adjacent thereto; a source of direct current having two terminals; means connecting one of said terminals to said first and fourth contacts; means including first and second high frequency impedance means connecting said other terminal and said second and third contacts, a direct current flowing from said source through a circuit so as to intersect said magnetic flux, said circuit including said connection means, said first and second contacts, said first impedance means, and said seismic mass element when said element is electrically connecting said first and second contacts, said circuit including said connection means, said third and fourth contacts, said second impedance means, and said seismic mass element when said element is electrically connecting said third and fourth contacts; means connected to said circuit means for superimposing a relatively high frequency alternating signal on said direct currents; and alternating cycle counting means connected to said first and second impedance means and effective to produce an output signal indicative of the difference in the number of alternating cycles applied thereto respectively from said first and second impedance means.

16. A linear accelerometer comprising: a support magnetic fluxe producing means, said support and said flux producing means being connected together so as to define an elongated gap therebetween, and said flux producing means being effective to cause magnetic flux to flow in said gap; first and second current conducting means positioned adjacent to and with respect to said elongated gap and cooperating therewith to form an elongated passage, at least one of said current conducting means having a finite impedance; conductive liquid seismic mass means positioned within said passage, electrically connecting said current conducting means, and adapted to move along said passage and relative to said current conducting means in response to accelerations along said passage; and circuit means connected to said current conducting means, said circuit means becoming effective upon relative movement of one sense between said seismic mass and said current conducting means along said passage to cause a current to flow through said seismic mass at right angles to and interacting with said flux field, said current being of a sense so as to impart to said seismic mass a force tending to oppose said relative motion.

17. A force rebalance accelerometer comprising: magnetic flux producing means; means defining an elongated gap, said flux producing means being effecitve to cause magnetic flux to bridge said gap; first and second current conducting means positioned adjacent to and fixed with respect to said elongated gap and cooperating therewith to form an elongated passage, at least one of said current conducting means having a finite impedance; conductive seismic mass means positioned with said passage, electrically connecting said current conducting means, and adapted to move along said passage and relative to said current conducting means in response to accelerations along said passage; and means including circuit means connected to said current conducting means and effective upon relative movement of one sense between said seismic mass and said current conducting means along said passage to cause current to flow through said seismic mass at right angles to and interacting with said flux field, said current being of a sense so as to impart to said seismic mass a force tending to oppose said relative motion.

18. A force rebalance accelerometer comprising: magnetic flux producing means; means defining an elongated gap, said flux producing means being effective to cause magentic flux to bridge said gap; first and second current conducting means positioned adjacent to and fixed with respect to said elongated gap and cooperating therewith to form an elongated passage, at least one of said current conducting means having a finite impedance; conductive seismic mass means positioned within said passage, electrically connecting said current conducting means, and adapted to move along said passage through said flux and relative to said current conducting means in response to accelerations along said passage; and circuit means connected to said current conducting means.

19. A force rebalance accelerometer comprising: magnetic flux producing means; means defining an elongated gap, said flux producing means being effective to cause magnetic flux to bridge said gap; first and second current conducting means positioned adjacent to and fixed with respect to said elongated gap and cooperating therewith to form an elongated passage, at least one of said current conducting means having a finite impedance; and conductive liquid seismic mass means positioned within said passage, electrically connecting said current conducting means, and adapted to move along said passage through said flux and relative to said current conducting means in response to accelerations along said passage.

References Cited in the file of this patent

UNITED STATES PATENTS

| | | |
|---|---|---|
| 2,702,186 | Head et al. | Feb. 15, 1955 |
| 2,733,116 | Fantham et al. | Jan. 31, 1956 |
| 2,943,493 | Ten Bosch et al. | July 5, 1960 |
| 2,946,226 | Wendt et al. | July 26, 1960 |
| 2,950,908 | Rainsberger et al. | Aug. 30, 1960 |

FOREIGN PATENTS

| | | |
|---|---|---|
| 708,228 | Great Britain | Apr. 28, 1954 |